CONNECTOR FOR UNDERWATER PIPELINES

Original Filed Oct 10. 1966 5 Sheets-Sheet 1

Leonard E. Williams
David L. Gruller
INVENTORS

BY
Browning, Serino, Hyer & Eichenwald
ATTORNEYS

CONNECTOR FOR UNDERWATER PIPELINES

Original Filed Oct. 10. 1966 5 Sheets-Sheet 2

Leonard E. Williams

David L. Gruller

INVENTORS

BY

Browning, Simms, Hyer & Eichenwald

ATTORNEYS

CONNECTOR FOR UNDERWATER PIPELINES

Original Filed Oct. 10. 1966 5 Sheets-Sheet 3

Leonard E. Williams
David L. Gruller
INVENTORS
BY
Browning, Simms, Dyer & Eichenwald
ATTORNEYS

CONNECTOR FOR UNDERWATER PIPELINES

Original filed Oct. 10. 1966 5 Sheets-Sheet 4

Leonard E. Williams
David L. Gruller
INVENTORS

BY
Browning, Simmons, Hyer & Eickemeyer
ATTORNEYS

CONNECTOR FOR UNDERWATER PIPELINES

Original Filed Oct. 10, 1966 5 Sheets-Sheet 5

Leonard E. Williams
David L. Gruller
INVENTORS

BY
Browning, Simmons, Dyer & Eichenlaub
ATTORNEYS

United States Patent Office

Re. 27,340
Reissued Apr. 25, 1972

27,340

CONNECTOR FOR UNDERWATER PIPELINES

Leonard E. Williams and David L. Gruller, Houston, Tex., assignors to Cameron Iron Works, Inc.

Original No. 3,481,396, dated Dec. 2, 1969, Ser. No. 748,122, June 27, 1968, which is a continuation of Ser. No. 585,549, Oct. 10, 1966. Application for reissue Mar. 2, 1970, Ser. No. 15,972

Int. Cl. E21b 7/12

U.S. Cl. 166—.6 43 Claims

Matter enclosed in heavy brackets [ ] appears in the original patent but forms no part of this reissue specification; matter printed in italics indicates the additions made by reissue.

ABSTRACT OF THE DISCLOSURE

An underwater wellhead assembly include a Christmas tree having a bore therethrough, a first pipeline section connected at one end to the tree to communicate with the bore and having its other end supported in a substantially horizontal position, and a second pipeline section supported in a generally horizontal position with its end axially aligned with and spaced from the substantially horizontal end of the first section. A connector body is lowered on a running tool from the surface of the water into a position between the spaced-apart flowline ends so as to dispose a passageway through the body in alignment with the flowline ends. The first section is curved intermediate its ends to permit its other end to be moved axially toward and away from the end of the first section, and a means supported by the running tool is engageable with the flowline sections and remotely operated for moving the end of the first section into engagement with the body and the body into engagement with the second section *so as to fluidly connect the sections.* Additional means supported by the running tool is remotely operable for holding the ends of the flowline sections and the body in engagement independently of the moving means, and the tool is releasable from the connector body and holding means to permit it and said moving means to be returned to the surface of the water.

This application is a continuation of our copending application, Ser. No. 585,549, filed Oct. 10, 1966, and entitled "Connector for Underwater Pipelines," now abandoned.

This invention relates to apparatus for remotely *fluidly* connecting and disconnecting two sections of a pipeline.

The connector of this invention can be used to *fluidly* connect together any two sections of a pipeline. It is particularly useful in *fluidly* connecting together two sections of a pipeline, such as a flowline or a control line, at a point adjacent the well-head of an oil or gas well that is located adjacent the bottom of a relatively deep body of water. Usually, when completing such a well, one section of the flowline is connected to the Christmas tree and curved so that it forms a large loop having one end approximately in line with a vertical flow passageway in the wellhead and the other end substantially horizontal. The latter end then is generally in axial alignment with the adjacent end of the other section of the flowline, which extends along the bottom from the wellhead to production facilities located on a platform above the water or on an adjacent shore.

In the past, the adjacent ends of the two sections have been *fluidly* connected remotely by apparatus that was lowered into position on the ends of the two sections that it was to remotely connect. With this arrangement, the actuating portion of the appaartus remained with the pipeline sections it connected. Also, if the seals in the connector required changing, or if for any reason it was necessary to perform repairs on the connector, it was necessary to raise the end of at least one of the sections of the pipeline. If the connector was being used to connect two sections of a number of pipelines, then, of course, the end or ends of a whole group of sections would have to be raised to perform the necessary repair work on the connector.

It is therefore an object of this invention to provide apparatus for *fluidly* connecting the adjacent ends of two sections of a pipeline that can be lowered from the surface after the pipeline sections are in place.

It is another object of this invention to provide apparatus for *fluidly* connecting together two sections of an underwater pipeline wherein the seals employed in the connector can be repaired or replaced without having to raise either section of the pipeline to the surface of the water.

It is another object of this invention to provide apparatus that can be lowered from the surface to *fluidly* connect the adjacent ends of the two pipeline sections through a connector body after which it can be removed.

It is another object of this invention to provide apparatus for *fluidly* connecting together two sections of an underwater pipeline wherein the actuating portion of the apparatus can be removed from the water when not in use.

It is another object of this invention to provide improved apparatus for remotely *fluidly* connecting and disconnecting two sections of underwater pipeline that is reliable and economical to manufacture and which creates no reductions or enlargements in the flow passageway through the pipeline.

These and other objects, advantages, and features of the invention will be apparent to those skilled in the art from a consideration of this specification and attached drawings.

The preferred embodiment of the invention will now be described in detail in connection with the attached drawings in which.

Figure 8:
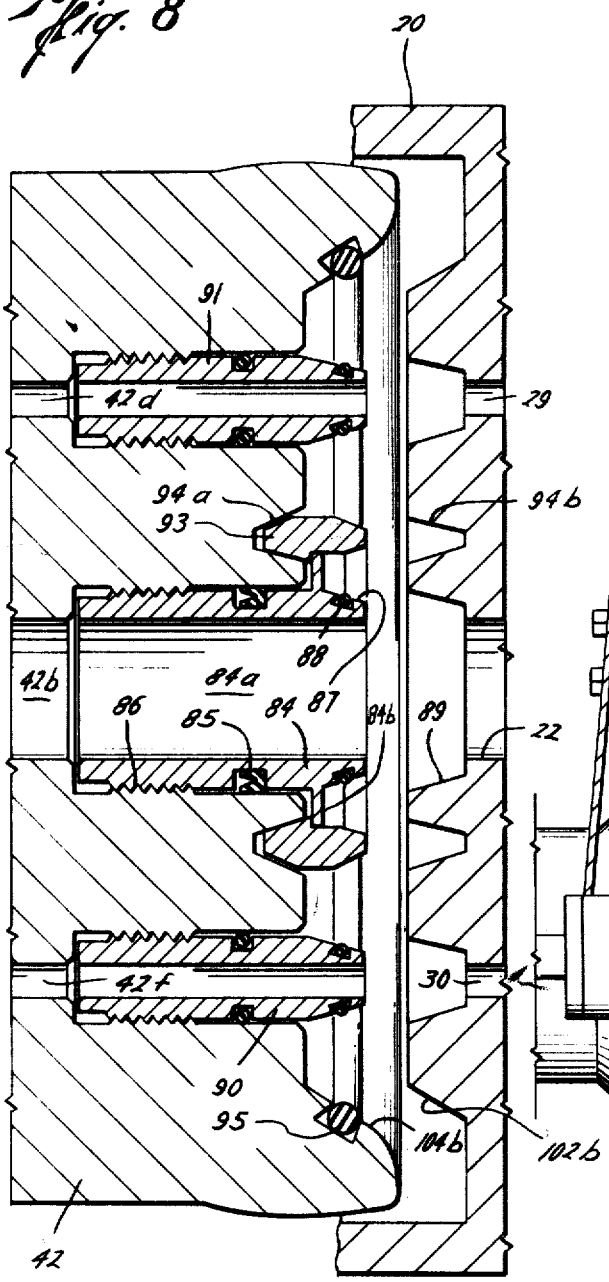
Figure 9:
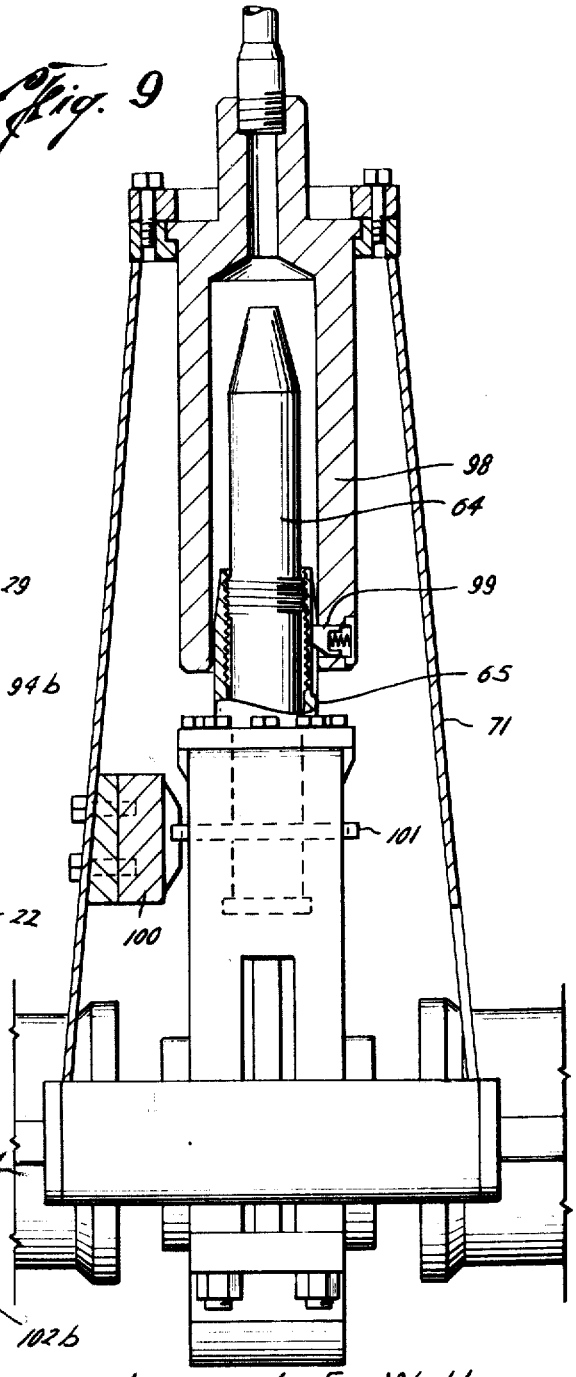

FIG. 8 is a view on an enlarged scale of a portion the apparatus that carries the seal and which can be removed to the surface without having to raise the end of either section of the pipelines it serves to *fluidly* connect; and FIGURE 9 is a side view, partially in section, of the apparatus after it has disconnected the ends of the pipeline sections preparatory to removal of the seal bearing portion to the surface.

Figure 1:
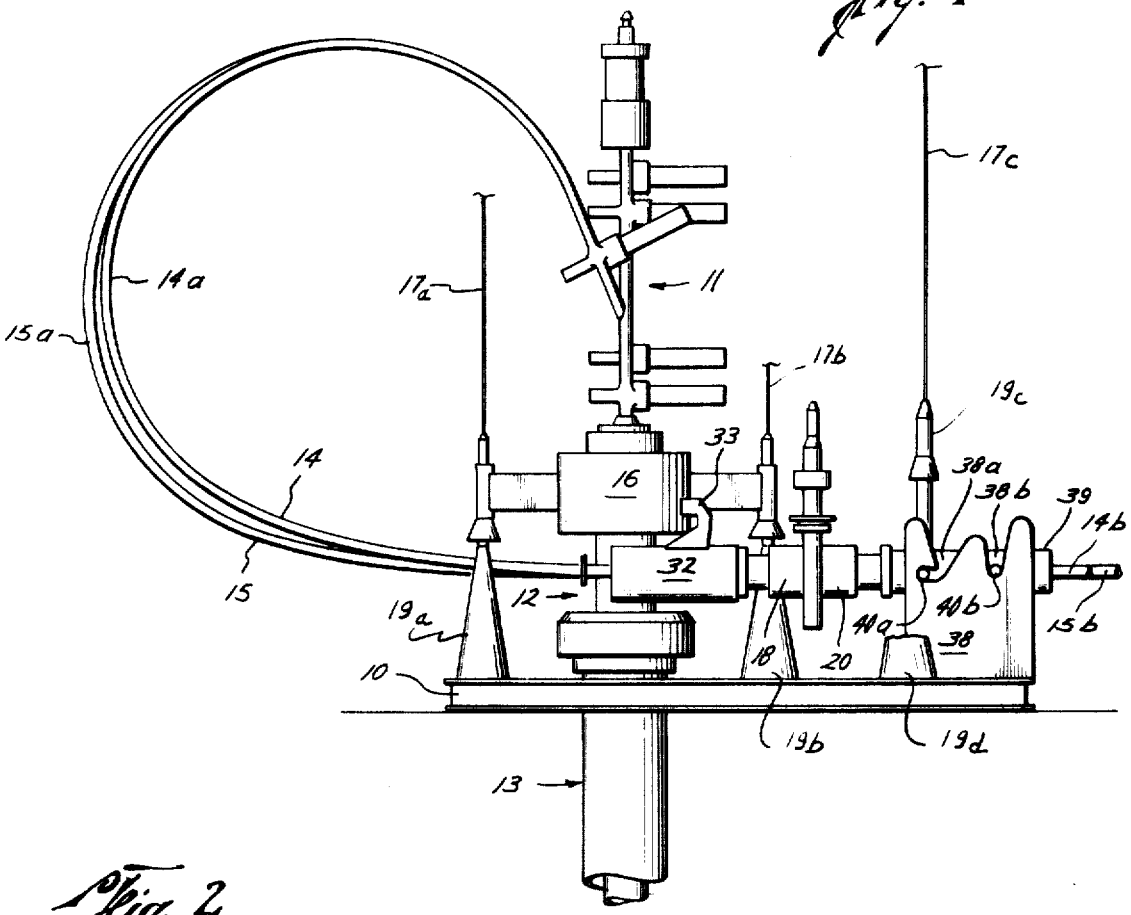
FIG. 1 is a view, in elevation, of an underwater wellhead assembly with the apparatus of this invention *fluidly* connecting together two sections of two underwater pipelines connected to the wellhead assembly.

The underwater wellhead of FIGURE 1 includes a base 10 and a Christmas tree 11. The Christmas tree is mounted on casing head assembly 12, which is supported by casing 13 extending into the ground below the water. The Christmas tree is connected to the casing head assembly by remotely operable connector 16.

A plurality of flexible guide lines 17a–17d extend from the surface of the water and are attached to base 10 by posts 19a–19d. These guide lines are used to lead equipment to and from the wellhead in the well known manner. The posts to which they are attached provide the more accurate guidance required as the equipment approaches its destination.

Two flowlines 14 and 15 are shown leading from the wellhead. One flowline is made up of sections 14a and 14b, the other of sections 15a and 15b. Each of sections 14a and 15a has one end connected to the Christmas tree. These sections then curve away from the Christmas tree until their other ends are generally horizontal. Being curved in this manner, the horizontal ends of the two sections can be moved axially a substantial distance without damage to the flowlines. Each of sections 14b and 15b of the flowlines has one end located adjacent the wellhead and extends to remotely located production facilities.

Figure 3:
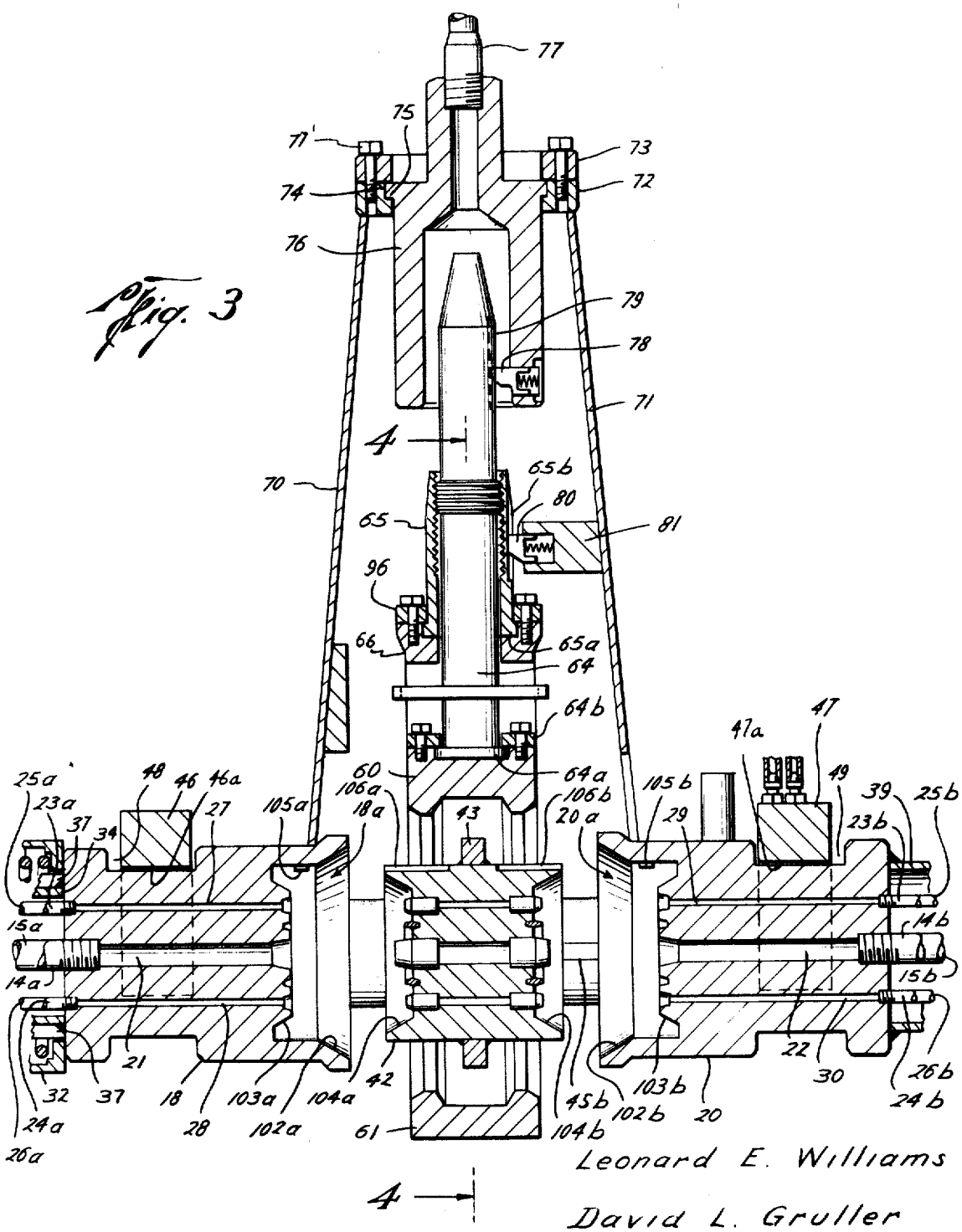
FIG. 3 is a vertical, sectional, view taken along line 3—3 of FIG. 4 with apparatus of this invention in position preparatory to *fluidly* connecting the ends of the pipeline sections.
Figure 4:
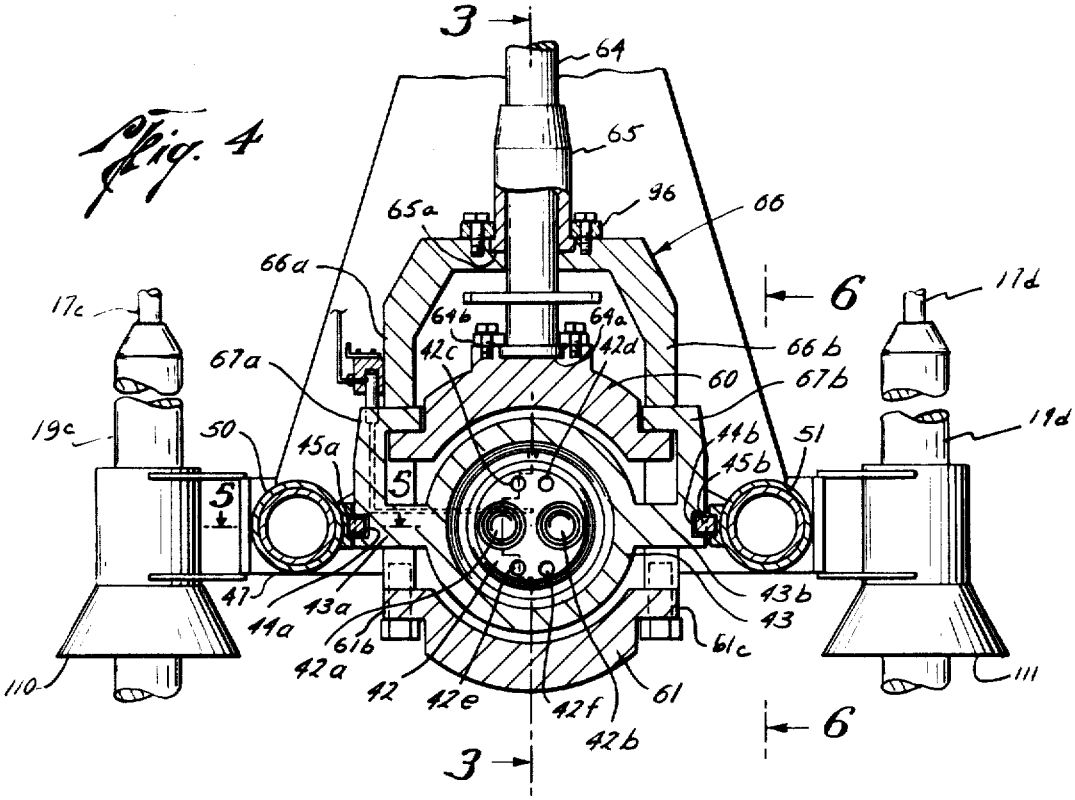
FIG. 4 is a sectional view taken along line 4—4 of FIG. 3.

In addition to the two flowlines, there are four control lines, as shown in FIGURES 3 and 4 but omitted in FIGURE 1. These are used for operating valves and the like at the wellhead from the remote production facility and may be looped for axial displacement of their ends. A hub 18 provides a common end for flowline sections 14a and 15a and sections 23a, 24a, 25a and 26a of the control lines. Hub 18 is provided with longitudinal openings 21, 27, 28 and three similar openings not shown but identical in cross-sectional arrangement with the openings shown in FIGURE 4. These six openings are extensions of the flow and control line sections which are threadedly connected to the hub. Similarly, hub 20 has six openings (22, 29 and 30 being shown) providing extensions of flowline sections 14b and 15b and control line sections 23b, 24b, 25b, and 26b which are threadedly connected to the hub.

Means are provided for holding the end of one section of the underwater pipeline in axial alignment generally with the adjacent end of the other section, to which it is to be *fluidly* connected, and movable axially relative thereto. In the embodiment shown, hub 18 is held against lateral movement and in axial alignment generally with hub 20 by housing 32. The housing is mounted on the Christmas tree assembly by bracket 33, as shown in FIGURE 1. Connected to hub 18 is sleeve 34, which exteds into and is slidably supported by housing 32. The sleeve has end flange 35, opposite the hub, which is engaged by the end of coil spring 36. The spring is compressed between flange 35 on the sleeve and inwardly extending flange 32a on the housing to resiliently urge the sleeve and the hub to the left, as viewed in FIGURE 7, i.e., the spring tends to pull the sleeve into the housing. If the spring is relatively long, spring guides 36a and 36b may be provided.

For a short distance back from the hub, sleeve 34 is provided with a plurality of radially extending stabilizer fins 37. These fins engage flange 32a and hold the sleeve and also the hub in axial alignment with housing 32 for a short distance as the hub moves away from the housing. After the fins move out of the sleeve, some lateral movement of the hub is allowed to permit it to adjust for any slight misalignment between it and the other parts of the apparatus. Flange 35, however, does continue to guide the sleeve to some extent after the fins are out of the housing.

Means are also provided for holding the end of the other section of the underwater pipeline in axial alignment generally with the end of the first section to which it is to be connected. In the embodiment shown, hub 20 is held in such position by plates 38. These plates are mounted on base 10 of the wellhead and extend upwardly therefrom. Two such plates are provided, one being located directly behind and parallel to the plate shown in FIGURE 1. Each plate has a pair of slots 38a and 38b. Hub 20 has attached to it sleeve 39, which encloses the flowlines and control lines where they are connected to the hub. The sleeve is provided with two pairs of longitudinally spaced, laterally extending pins which are arranged to engage the slots in both plates 38. The interengagement of the pins in the slots then holds hub 20 in axial alignment with hub 18. Only pins 40a and 40b are shown in FIGURE 1.

As shown in FIGURE 1, slots 38a have an undercut portion to receive pins 40a and hold the sleeve 39 against directly upward movement. This will require that the sleeve be inclined with the hub end down when pins 40a are first moved into slots 38a.

To *fluidly* connect together the adjacent ends of the sections of these underwater pipelines, connector body 42 is provided, having a longitudinal opening for each line. Thus, as shown in FIGURE 4, the connector body has two large openings 42a and 42b to provide flow passageways to *fluidly* connect the flowline sections, and smaller openings 42c through 42f for *fluidly* connecting the control line sections.

Means are provided for positioning the connector body between the adjacent ends of the pipeline sections it is to *fluidly* connect with its openings in approximate axial alignment with those through the hubs. In the embodiment shown, connector body 42 extends through and is attached to support ring 43. Extending laterally of the support ring are arms 43a and 43b. The outer edges of the arms are provided with key slots 44a and 44b, respectively. Ring 43 and connector body 42, in turn, are then supported by horizontal keys 45a and 45b. These keys are rigidly attached to yokes 46 and 47 which are located at opposite sides of the connector body. These yokes are part of the actuating portion of the apparatus, which will be described below. The keys are identically shaped. Key 45a is rigidly attached to and extends horizontally from yoke 46 to engage key slot 44a. Key 45b is rigidly attached to yoke 47 and extends parallel to key 45a to engage key slot 44b.

Figure 2:
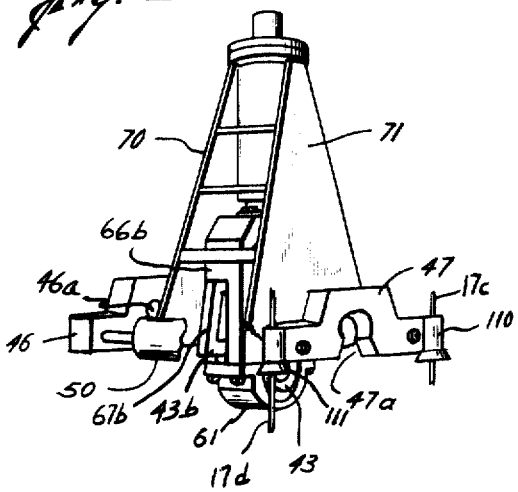
FIG. 2 is an isometric view of the portion of the apparatus that is lowered from the surface to *fluidly* connect the ends of the underwater pipeline sections.

The keys then [suuport] *support* the connector body relative to yokes 46 and 47. The yokes have downwardly opening slots 46a and 47a (FIGURE 2). These slots have a width at their upper end that is less than the outside diameter of the hubs except where the hubs are reduced to form annular grooves 48 and 49. With the grooved portions of the hubs in engagement with the slots in the yokes, as shown in FIGURE 3, the keys will position the connector body between the hubs with its openings in axial alignment generally with the openings in the hubs. Further, the interengaging surfaces of the yokes and the grooves will limit the movement of the yokes longitudinally relative to the hubs.

Figure 6:
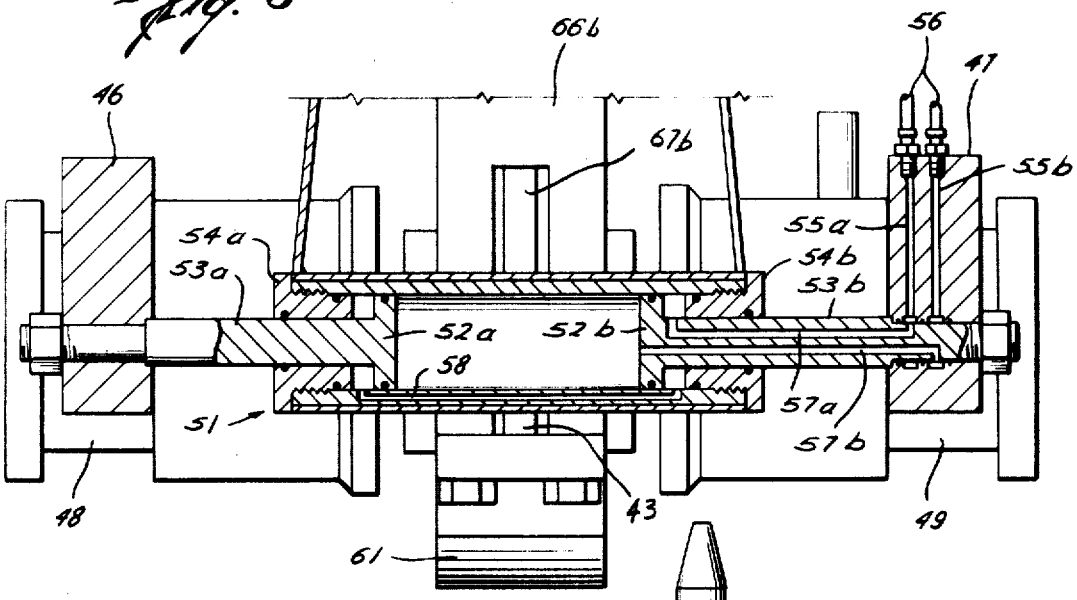
FIG. 6 is a sectional view taken along line 6—6 of FIG. 4.

Remotely controlled means are provided for moving the adjacent ends of two pipeline sections into engagement with the body with the passageways through their ends in approximate axial alignment with each other and those through the body. In the embodiment shown, fluid powered cylinders 50 and 51 are located on opposite sides of the connector body and extend between yokes 46 and 47. These cylinders are of identical construction so only one will be described. A cross-sectional view of cylinder 51 is shown in FIG. 6. It includes two opposing pistons 52a and 52b which in turn are connected to piston rods 53a and 53b. The ends of the cylinder are closed in the conventional manner by packing glands 54a and 54b. To supply operating pressure fluid to the power cylinder, yoke 47 is provided with drilled holes 55a and 55b. The holes are connected to hydraulic lines 56 that extend to the surface of the water to permit remote control of the power cylinders. The holes are also connected to holes 57a and 57b drilled longitudinally in rod 53b. Hole 57a in the rod supplies pressure fluid to the rod side of piston 52b. This same pressure fluid is supplied to the rod side of piston 52a by passageway 58 in the cylinder wall. Hole 57b supplies pressure fluid to the space between the two pistons. Suitable seals are provided as required. A similar hydraulic system is provided for cylinder 50.

Figure 7:
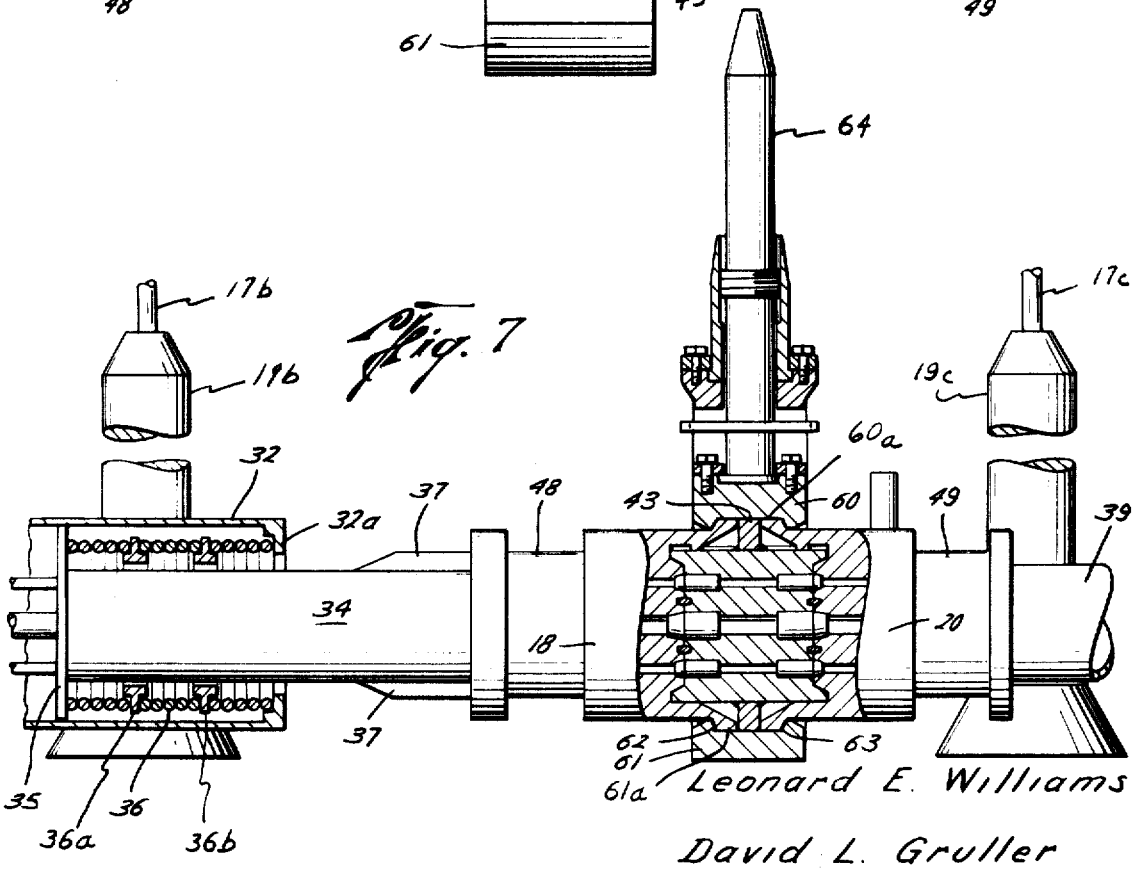
FIG. 7 is a side view, partially in section and partially in elevation, of the apparatus of this invention after the ends of the pipeline sections have been *fluidly* connected and the actuating portion removed.

With yokes 46 and 47 in engagement with the annular grooves in hubs 18 and 20, as shown in FIG. 3, by supplying pressure fluid to the rod side of the pistons in the power cylinders, the yokes will be moved toward each other and, in turn, move hubs 18 and 20 toward each other. In this embodiment, however, hub 20 is held against longitudinal movement. Therefore, yoke 46 will move hub 18 toward the right, as viewed in FIG. 3, until such movement is stopped by the engagement of connector body 42 with both hubs, as shown in FIG. 7. This movement is permitted by the compression of coil spring 36 and the bending of the looped lines connected to hub 18.

Hubs 18 and 20 have cavities 18a and 20a, respectively, to receive the connector body. The cavities have outer tapered surfaces 102a and 102b to guide the hubs and connector body toward axial alignment, when they first move into engagement, if there is some initial misalignment. The cavities also have inner tapered surfaces 103a and 103b. The ends of the connector body are countersunk tapered surfaces 104a and 104b. These latter surfaces engage inner surfaces 103a and 103b on the hubs and make the final alignment of the hubs and the connector body. Keys 105a and 105b are mounted in cavities 18a and 20a, respectively, to engage the connector body slots 106a and 106b, respectively, and orient the connector body relative to the hubs so the openings through the body will be substantially in axial alignment with the passageways through the hubs. Also helping to align these members is the engagement of the ends of the hubs with mounting ring 43. Thus, the power cylinders and yokes will move the hubs and connector body into engagement as shown in FIG. 7, and the flowline sections and control line sections will be *fluidly* connected through the openings in the connector body.

Figure 5:
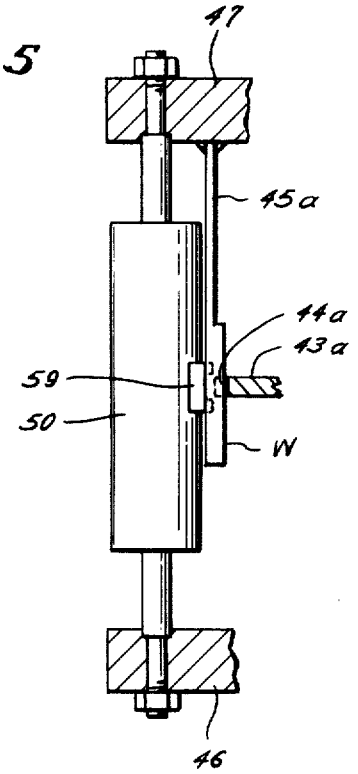
FIGS. 5 and 5A are partial sectional views taken along line 5—5 of FIG. 4 showing this portion of the apparatus in two positions.
Figure 5A:
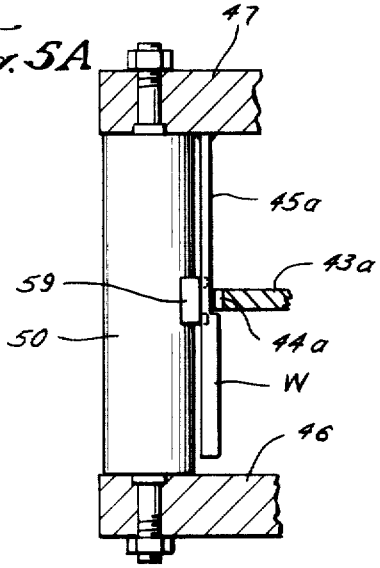

As shown in FIGS. 5 and 5A, as the yokes move together to bring the connector body into engagement with the two hubs, keys 45a and 45b will move out of supporting engagement with the arms of support ring 43. This action with respect to key 45a is shown in these figures, but it is the same for both keys. Key 45a has a wide section W at its outer end, which extends laterally far enough to engage the key slot 44a. Thus, when the yokes are extended, as shown in FIG. 5, the key will support ring 43 through arm 43a. Cylinder 50 is provided with a U-shaped guide 59 to help support the key. As the yokes move together to the position shown in FIG. 5A, the wide section moves out of engagement with the key slot. The length of section W is such that this will not occur until the connector body is captured within the cavities in the ends of the hubs.

When portion W has moved out of engagement with the key slot, the hydraulic cylinders and the yokes are free to be removed from the water, if some other means are provided to hold the hubs in engagement with the connector body. In the embodiment shown, a screw clamp is provided for this purpose. The clamp includes opposed C-shaped clamp members 60 and 61 positioned on opposite sides of support ring 43 and outwardly extending flanges 62 and 63 on the ends of the hubs. The clamp members are provided with internal grooves 60a and 61a (FIG. 7) into which the support ring and flanges extend.

To move the clamp members into position to hold the hubs in engagement with the connector body, threaded rod 64 (FIGS. 3 and 4) is rotatably connected to clamp member 60 and nut 65 is rotatably connected to clamp member 61. Clamp member 61 is connected to nut 65 through U-shaped support bracket 66. The bracket has bifurcated arms 66a and 66b that extend downwardly on each side of arms 43a and 43b of the support ring (FIGS. 2 and 4). The lower ends of the bifurcated arms are attached to clamp member 61 by machine screws which extend through holes in outwardly extending flanges 61b and 61c to engage tapped holes in the bracket's arms. Nut 65 is provided with outwardly extending flange 65a. Cap ring 96 encircles the nut and is bolted to the bracket to rotatably connect the nut to the bracket. Rod 64 is rotatably connected directly to clamp member 60 in the same manner through integral flange 64a and cap ring 64b.

To support the clamp in the open position, upwardly extending L-shaped support members 67a and 67b extend upwardly from arms 43a and 43b of the support ring and engage the bottom of the bifurcation in the arms of the U-shaped bracket 66. These members then support bracket 66, which in turn supports clamp member 61, and nut 65. The nut, in turn, supports threaded rod 64, which supports clamp member 60. Thus, the clamp is supported along with the connector body by keys 45a and 45b, while the apparatus is being lowered from the surface of the water into position to connect the pipeline sections. After the hubs have moved into engagement with the support ring, they will support the clamp in both the open and closed positions.

Means are provided to operate the clamp. In the embodiment shown, such means are included as part of the running tool for lowering the connector body and the actuating portion of the apparatus from the surface to the wellhead. The running tool includes plates 70 and 71 which are attached at their lower ends to pressure cylinders 50 and 51. At their upper ends, the plates are connected to annular collar 72. Annular collar 72 is provided with an internal groove 74 to receive outwardly extending flange 75 on running sub 76. Annular cap 73 is attached to collar 72 by machine screws 77 and holds the flange in the groove. Thus, the cap transmits the load imposed thereon by the apparatus suspended from ring 72 to the running sub, while allowing relative rotation between the running sub and collar 72. Drill pipe 77 is connected to the running sub and supports the running tool and the portion of the apparatus supported thereby.

To guide yokes 46 and 47 into position to engage the grooves in the hubs, guide funnels 110 and 111 (FIG. 4) are attached to yoke 47 on opposite sides thereof. These funnels move along guide lines 17c and 17d as the running tool moves from the surface of the water to the wellhead. The final alignment is provided when the sleeves slide over posts 19c and 19d, which move the yokes into position to engage the grooves in the hubs.

To close the clamp, running sub 76 is arranged to extend down over threaded rod 64. Spring loaded key 78 is mounted on the sub to engage elongated key slot 79 in the rod. Rotation of drill pipe 77 then will impart rotation to rod 64 of the spring clamp assembly. Nut 65 is held against rotation by spring loaded key 80 mounted on bracket 81, which is attached to plate 71 of the running assembly. Key 80 engages elongated vertical key slot 56b in the side of the nut. Rotation of the rod relative to the nut moves the rod downwardly relative to the nut until clamp member 70 engages the top of the hubs, after which continued rotation will move lower clamp member 61 up into engagement with the lower portion of the underside of the hub. As soon as the clamp is closed on the hubs, the yokes, the hydraulic cylinders, the plates, the running sub, etc., can be removed from the water, leaving the pipeline connection as it appears in FIGS. 1 and 7.

Means are provided for forming a seal between the connector body and the adjacent ends of two pipeline sections when the ends are in engagement with the body. In this embodiment, the connector body is employed to *fluidly* connect together two sections of six lines. FIG. 8 is a sectional view on an enlarged scale of the sealing means employed in this embodiment. Each passageway through connector body 42 is equipped at each end with a seal nipple having an opening therethrough equal in diameter to the opening through the line it is associated with. FIG. 8 shows the seal nipples associated with one end of the openings.

Seal nipple 84 is threadedly connected to connector body 42 and has an opening 84a in axial alignment with opening 42b in the connector body. The seal nippe has a first seal ring 85 that prevents fluid from escaping past threads 86 and along the outside of the seal nipple. The outer end of the seal nipple has tapered surface 87 in which O-ring 88 is located. The outer end of opening 22 in hub 20 is countersunk to provide tapered surface 89. This surface is designed to engage tapered surface 87 and compress O-ring 88 between the seal nipple and the hub sufficiently to provide a seal therebetween. Seal nipples 90 and 91 are constructed in the same way and function in the same way as seal nipple 84 just described. Also, the ends of openings 29 and 30 through hub 20 are provided with tapered surfaces to similarly engage these seal nipples.

Since it would be difficult and time consuming to machine these seal nipples, the connector body, and the hub so that all the mating tapered surfaces engage with the same force, the tapered ends of the seal nipples are designed to yield sufficiently to accommodate ordinary machining tolerances.

To further isolate the flowline made up of sections 14a and 14b from the remainder of the lines being connected in this embodiment, metal ring gasket 93 is arranged to encircle seal nipple 84 and engage ring grooves 94a and 94b in the connector body and hub 20, respectively. This prevents any fluid which may escape from this flowline from migrating into another line or vice versa. Ring gasket 93 is held in place in groove 94a when out of engagement with groove 94b, by flange 84b integrally attached to seal nipple 84. A similar ring gasket seal is used with the other flowline.

To seal the interface between the connector body and the hub, O-ring 95 is located in tapered surface 104b on the connector body to engage tapered surface 102b on hub 20 and form a seal therebetween. An O-ring (not shown) is similarly located on tapered surface 104a of the body. These O-rings provide an additional safety seal, should one or more of the internal seals begin to leak, to keep the leaking fluid from escaping into the surrounding water.

If a seal should leak or if for any reason it is desirable to disconnect the lines and raise the connector body to the surface, a running tool assembly such as shown in FIG. 9 is lowered from the surface for this purpose. This running tool assembly is identical to that used to run the connector body and actuating portion of the apparatus described above except that, instead of including means for closing the clamp, it includes means to release the clamp so that the hubs can be moved apart and out of engagement with the connector body. As shown in FIG. 9, running sub 98, which is longer than sub 76, is used. It is provided with spring loaded key 99 to engage external vertical slot 65b in nut 65. Rotation of the drill pipe now rotates the nut. Holding the rod against rotation, so that the relative rotation can occur, is stop 100. It is attached to a plate 70 in position to engage member 101 extending transversely of the rod. In this way, rotation of the drill pipe in the same direction as it was rotated to close the clamp will cause clamp members 60 and 61 to move apart out of engagement with the hubs.

After the clamp has been opened, pressure can be applied to the power cylinders and the yokes will move apart, moving hub 18 axially away from the connector body. The yokes were lowered from the surface, of course, spaced the proper distance to engage the annular grooves in the hubs. As the yokes move apart, the power cylinders will also move laterally in the direction of movement of hub 18. This will cause plates 70 and 71, running sub 98, and the clamp also to move laterally. The clamp will carry the connector body support ring with it as it moves which will move the connector body axially away from hub 20.

As this occurs, keys 45a and 45b will re-engage the key slots in the arm 43a and 43b of the connector body support ring so that the connector body and the clamp are again supported by the keys. The drill pipe can then be raised to the surface, bringing with it the connector body so that it can be inspected and any necessary repairs made thereto.

The apparatus of this invention has been shown in the drawings and described for simply, *fluidly* connecting two sections of a pipeline. This same apparatus could be used to install a valve or some other piece of equipment in a pipeline at a remote point.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for *fluidly* connecting the remotely located [, adjacent] ends of first and second sections of a pipeline where the end of the first section is movable axially toward the [adjacent] end of the second section and each section has a passageway therethrough, comprising means for holding the [end of the first section] *ends of the first and second sections* in axial alignment generally with *one another and* the end of the [second] *first* section [and] for axial movement relative to the end of the second section, [means for holding the end of the second section in axial alignment generally with the end of the first section,] a connector body insertable into a position between the ends [to connect the ends when in engagement therewith], means for supporting the body in said position between the [adjacent] ends of the two pipeline sections, and remotely controlled means engageable with the ends of the first and second sections of the pipeline for moving [them into engagement with] *said first section toward the second section to cause* the body *to be engaged between them,* said connector body having a passageway in axial alignment with those through the first and second pipeline sections when so engaged *for fluidly connecting said sections.*

2. The apparatus of claim 1, in which the remotely controlled moving means also includes means engageable with said ends for moving [them out of engagement] *said first section away from the second section to cause them to be disengaged* with the connector body to disconnect the two [adjacent] ends of the pipeline and allow the connector body to be removed from between the ends.

3. The apparatus of claim 1, in which the means for [moving] *causing* the ends of the sections [into engagement] *to be engaged* with said body includes two spaced parallel yokes arranged to be moved into engagement with the ends of the two sections with each yoke engaging one of the ends, engaging surfaces on the yokes and the ends to hold each yoke from moving relative to the end it is in engagement with *in* the direction of the other end, and means for moving the yokes toward each other to [move] *cause* the ends of the two sections and the body [into engagement] *to be engaged.*

4. The apparatus of claim 3, wherein there are parts on the yoke moving means slidably engaged with parts on the connector body to support the body, when the ends of the sections are out of engagement with the body, and movable out of engagement therewith, when the yokes have [moved] *caused* the ends of the pipeline sections [into engagement] *to be engaged* with the body, so as to release the supporting and moving means from said body.

5. The apparatus of claim 1, further provided with means for holding the ends of the sections in engagement with the body independently of said remotely controlled moving means.

6. The apparatus of claim 5, in which the releasable holding means comprises a screw clamp.

7. The apparatus of claim 5, wherein the supporting means is releasable from the connector body and the moving means is disengageable from the ends of said sections to permit them to be removed therefrom when said ends are held in engagement with said body.

8. The apparatus of claim 7, wherein the supporting means is released from the connector body when the ends of the sections have been [moved] *caused to move* into engagement with the body.

9. Apparatus for *fluidly* connecting together the ends of first and second sections of an underwater pipeline which are spaced apart, and wherein the end of the first section is movable axially relative to the end of the second section, said apparatus comprising a first hub adapted to be connected [to] *at* the end of the first section and a second hub adapted to be connected [to] *at* the end of the second section, each hub having an opening therethrough for alignment with the *remainder of the* pipeline section to which it is connected, means mounting the hubs in spaced axial alignment and for axial movement of the first hub relative to the second, a connector body having a passageway therethrough for alignment with the openings in the hubs, means for lowering the connector body from the surface of the water to a position between the spaced hubs, means for sealing between the connector body and each hub when the hubs are in engagement with the body to isolate the fluid flowing in each [pipeline] *opening* to said body passageway, and means for moving the [hubs into engagement with] *first hub toward the second hub to cause* the body *to be engaged between them* to connect the [adjacent] ends of the pipeline.

10. The apparatus of claim 9, further provided with means for holding the hubs in engagement with the body independently of the moving means to allow the moving means to be returned to the surface of the water after the pipeline sections have been connected.

11. The apparatus of claim 9 in which the means for moving the [hubs into engagement with the body] *first hub toward the second hub* includes two spaced parallel yokes each to engage one of the hubs, engaging surfaces on the yokes and the hubs to hold each yoke from moving relative to the end it is in engagement with in the direction of the other end, and means for moving the yokes *relatively* toward each other.

12. Apparatus for *fluidly* connecting the axially aligned, spaced-apart ends of first and second sections of an underwater pipeline, where the end of the first section is movable axially toward the end of the second section, comprising a connector body insertable between the ends of the pipeline sections *and having a passageway therethrough* for *fluidly* connecting them when in engagement therewith, means for lowering the connector body from the surface of the water [and] into a position between the ends to be connected, remotely operated means for moving the [ends] *first end* of the pipeline sections [into engagement with] *toward the second end to cause* the body *to be engaged between them* when so positioned, and remotely operated means for holding the ends of the pipeline sections in engagement with the body.

13. Apparatus for *fluidly* connecting the axially aligned, spaced-apart ends of first and second sections of an underwater pipeline, where the end of the first section is movable axially toward the end of the second section, comprising a connector body *having a passageway therethrough* for *fluidly* connecting the [adjacent] ends of the pipeline sections when engaged therebetween, [and a running and actuating tool assembly including] means for supporting the connector body as [the running tool] *it* is lowered through the water [and ] into a position between the pipeline section ends to be connected, remotely operated means for moving the [ends] *first end* of the pipeline sections [into engagement with] *toward the second end to cause* the connector body *to be engaged between them* when in such position, means for releasing the supporting means from the body when the body is so engaged by the ends, and remotely operated means for holding the ends and the body in engagement to permit said moving means to be returned with the [running tool assembly] *supporting means* to the surface of the water.

14. In an underwater wellhead assembly including a Christmas tree with a first flexible pipeline section [having one end] connected to the tree and the [the other] *an* end substantially horizontal and movable axially toward a second pipeline section having one end axially aligned with and spaced from the horizontal end of the first section, the improvement, in combination therewith, of remotely controlled apparatus for *fluidly* connecting the spaced ends of the pipeline sections, comprising means for holding the [end of the first section] *ends of the first and second sections* in axial alignment with [the adjacent end of] *one another and* the *end of the* [second] *first* section [and] for axial movement relative to the end of the second section, [means for holding the adjacent end of the second section in axial alignment with the adjacent end of the first section,] a connector body *having a passageway therethrough* for *fluidly* connecting the [adjacent] ends of the two sections when in engagement therewith, and remotely controlled running and actuating apparatus including means for supporting the body as it is lowered from the surface of the water into a supported position between said ends, remotely controlled means for moving the end of the first section axially toward the second [and] *to cause* [the ends and] the body [into engagement] *to be engaged between the ends,* said supporting means being releasable from the body when said ends and body are so engaged, and remotely controlled means for holding the ends in engagement with the body to permit said moving means to be returned to the surface of the water.

15. In an underwater well head assembly including a Christmas tree with a first curved pipeline section [having one end] connected to the tree end [the other] *an* end substantially horizontal and movable axially toward a second pipeline section having one end axially aligned with and spaced from the horizontal end of the first section, the improvement, in combination therewith, of apparatus for *fluidly* connecting said ends of the pipeline sections, comprising means for holding the horizontal end of the first section *and the end of the second section* in axial alignment with *one another and the horizontal end of the first section* [the adjacent end of the second section and] for axial movement relative to the end of the second section, [means for holding the adjacent end of the second section in axial alignment with the adjacent end of the first section,] a connector body between the [adjacent] ends of the two sections and in engagement therewith, *said body having a passageway therethrough,* seal means carried by the body for engaging the ends of the pipeline sections to provide a seal between the body and the ends to *fluidly* connect the two sections through the body *passageway,* resilient means urging the end of the first section away from the end of the second section and the body to permit the connector body to be removed from between the ends, and releasable means for moving the [ends into engagement with] *end of the first section toward the end*

*of the second section to cause* the body *to be engaged between them.*

16. Remotely controlled apparatus for operating in relatively deep water for moving tubular members axially *and relatively* toward and away from each other comprising, a pair of spaced parallel yokes, each adapted to engage one of the members, means for lowering the yokes into engagement with the members, means on the yokes engageable with the members to hold the yokes against movement relative to the members in the direction the members are to be moved, and means extending between the yokes for moving the yokes *relatively* together and apart to move the members *relatively* toward and away from each other.

17. Apparatus of the character defined in claim 16, including means for holding said members in the position to which they are moved toward one another independently of the moving means, and means on said lowering means for carrying said holding means.

18. Apparatus of the character defined in claim 17, including means for disconnecting the carrying means from the holding means to permit the yokes to be raised with the lowering means when said members are held by said holding means.

19. Apparatus for fluidly connecting the axially aligned, spaced-apart ends of first and second sections of an underwater pipeline, comprising a connector body removably insertable between the ends of the pipeline sections and having at least one passageway therethrough for fluidly connecting the ends when they are in engagement therewith, a tool for lowering the connector body from the surface of the water and into a position between the ends to be connected, and remotely operated means supported by said tool for moving the [ends] *end* of *one of* the pipeline sections [into engagement with] *toward the other end to cause* the body *to be engaged between them* when it is so positioned, said last-mentioned means being releasable to permit said ends to disengage from the connector body so that said body may be removed from between the flowline ends and raised with said tool to the surface of the water level.

20. Apparatus of the character defined in claim 19, including additional remotely operated means supported by said tool for holding said ends engaged with the connector body indepedently of the remotely operated moving means, said holding [mean] *means* also being releasable from said tool to permit it to hold said ends engaged as said moving means is raised with said tool.

21. Apparatus of the character defined in claim 20, including another tool adapted to be lowered from the surface of the water, remotely operated means supported by said other tool for releasing said holding means, and additional remotely operated means supported by said other tool for disengaging the ends from said body when said holding means has been so released.

22. Apparatus of the character defined in claim 20, including a hub connectible [to] *at* each end of the pipeline and having a recess therein, and wherein said moving means includes a pair of spaced yokes each adapted to engage in one of said recesses to thereby support said connector body between said ends, and means for selectively moving the yokes *relatively* toward and away from each other.

23. Apparatus of the character defined in claim 22, including means for supporting the hubs in axial alignment with one another.

24. For use in *fluidly* connecting the bore of an underwater Christmas tree with the end of a flowline adjacent to the tree and extending in a generally horizontal direction, apparatus comprising, a flowline section adapted to be connected at one end to the tree for communication with the bore, means for supporting the other end of said flowline section in axial alignment with and spaced from the end of the flowline, a connector body having a passageway therethrough, means for lowering the connector body from the surface of the water into a position in which its passageway is aligned with the spaced-apart, axially aligned ends of the flowline section and flowline, said flowline section being flexible intermediate its ends, and means supported by the lowering means for moving the other end of said flowline section into engagement with the body and said body into engagement with the said end of said flowline *for fluidly connecting said other end of the flowline section and said end of the flowline through said passageway.*

25. Apparatus of the character defined in claim 24, including means on said flowline section for retracting said other end thereof from said connector body upon release of said moving means from said ends.

26. Apparatus of the character defined in claim 24, including replaceable seals for sealing between the [ends of] said body, *the end of said flowline,* and other end of said other flowline section, said seals being carried by the connector body.

*27. Apparatus for fluidly connecting the spaced-apart ends of first and second sections of an underwater pipeline, comprising means for holding the ends of the first and second sections in axial alignment, a connector body, means for lowering the connector body from the surface of the water into a position between the ends to connect the ends when in engagement therewith, means for supporting the body in said position between the ends of the two pipeline sections, and remotely controlled means for causing the ends and the body to be engaged, said connector body having a passageway in axial alignment with the first and second pipeline sections when so engaged for fluidly connecting said sections.*

*28. Apparatus for fluidly connecting together the spaced-apart ends of first and second sections of an underwater pipeline, said apparatus comprising a first hub adapted to be connected at the end of the first section and a second hub adapted to be connected at the end of the second section, each hub having an opening therethrough for alignment with the remainder of the pipeline section to which it is connected, means mounting the hubs with their openings in spaced axial alignment, a connector body having a passageway therethrough, means for lowering the connector body from the surface of the water to a position between the spaced hubs in which its passageway is aligned with the openings in the hubs, means for sealing between the connector body and each hub when the hubs are in engagement with the body to isolate the fluid flowing in each opening to said body passageway, and remotely operated means for causing the hubs and the body to be so engaged.*

*29. The apparatus of claim 28, further provided with means for holding the hubs in engagement with the body independently of the remotely operated means to allow the moving means to be returned to the surface of the water after the pipeline sections have been connected.*

*30. Apparatus for fluidly connecting the axially aligned, spaced-apart ends of first and second sections of an underwater pipeline, comprising a connector body insertable between the ends of the pipeline sections and having a passageway therethrough for fluidly connecting them when in engagement therewith, means for lowering the connector body from the surface of the water into a position between the ends to be connected, remotely operated means for causing the ends of the pipeline and the body to be so engaged when the body is so positioned, and remotely operated means for holding the ends and body so engaged.*

*31. Apparatus for fluidly connecting the axially aligned, spaced-apart ends of first and second sections of an underwater pipeline, comprising a connector body having a passageway therethrough for fluidly connecting the ends of the pipeline sections when engaged therebetween, means for supporting the connector body as it is lowered through the water into a position between the pipeline section ends to be connected, remotely operated means for causing the ends of the pipeline sections and the con-*

*nector body to be so engaged when the body is in such position, remotely operated means for holding the ends and the body so engaged, and remotely operated means for releasing the supporting means from the body when the body and ends are so held to permit said supporting means to be returned to the surface of the water.*

*32. In an underwater wellhead assembly including a Christmas tree with a first flowline section having one end connected to the tree and the other end substantially horizontal, a second flowline section having one end axially aligned with and spaced from the horizontal end of the first section, the improvement in combination therewith, of a connector body having a passageway therethrough for fluidly connecting the adjacent ends of the two sections when in engagement therewith, means for lowering the body from the surface of the water into a supported position between said ends, and remotely controlled means for causing the ends and the body to be so engaged.*

*33. For use in fluidly connecting the bore of an underwater Christmas tree with the end of a flowline adjacent to the tree and extending in a generally horizontal direction, apparatus comprising a flowline section adapted to be connected at one end to the tree for communication with the bore, means for supporting the other end of said flowline section in axial alignment with and spaced from the end of the flowline, a connector body having a passageway therethrough, means for lowering the connector body from the surface of the water into a position in which its passageway is aligned with the spaced-apart, axially aligned ends of the flowline section and flowline, and means supported by the lowering means for causing the ends of said flowline section and flowline and the body to be engaged with the passageway for fluidly connecting said flowline section and flowline through said passageway.*

*34. Apparatus of the character defined in claim 33, including replaceable seals for sealing between the said body, the end of said flowline, and other end of said other flowline section, said seals being carried by the connector body.*

*35. Apparatus for fluidly connecting the spaced-apart ends of first and second sections of an underwater pipeline, comprising a connector body lowerable through the water into a position between the ends of the pipeline sections, said body having a passageway therethrough and replaceable seal means about each end of the passageway, and means lowerable with the body and remotely operable for selectively causing the seal means on the body and the ends of the flowline sections to be engaged so as to fluidly connect said sections through said passageway when said body is so positioned, and causing said seal means and ends to be disengaged so that the connector body may be raised from between the ends of the pipeline sections to said surface.*

*36. Apparatus of the character defined in claim 35, wherein said means for causing engagement and disengagement includes a fluid responsive reciprocating actuator, and said apparatus also includes additional means lowerable with the body and remotely operable for holding the seal means and the ends of the flowline sections engaged so that the fluid pressure on said actuator may be released.*

*37. Apparatus of the character defined in claim 36, including means for lowering each of said remotely operated means with said body and raising said means for causing engagement and disengagement separately of said body and holding means while said seal means and ends are held engaged.*

*38. Apparatus for fluidly connecting the spaced-apart ends of two sections of an underwater pipeline, comprising a connector body lowerable through the water into a position between the ends, said body having a passageway therethrough, and means lowerable with the body and remotely operable for selectively causing the body and the ends of the flowline sections to be engaged so as to fluidly connect said sections through said passageways when said body is so positioned, and causing said body and ends to be disengaged so that the connector body may be raised from between the ends of the pipeline sections to said surface.*

*39. Apparatus of the character defined in claim 38, wherein there is a hub at the end of each flowline section, said means for causing engagement and disengagement includes a fluid responsive reciprocating actuator, and said apparatus also includes additional means lowerable with the body and remotely operable for engaging the hubs to hold the body and the hubs engaged so that the fluid pressure on said actuator may be released.*

*40. Apparatus of the character defined in claim 39, including means for lowering each of said remotely operated means with said body and raising said means for causing engagement and disengagement separately of said body and holding means while said body and hubs are held engaged.*

*41. Apparatus of the character defined in claim 39, including replaceable seal means on the body for engaging said ends of the flowline sections so as to fluidly connect them.*

*42. Apparatus for fluidly connecting the spaced apart ends of first and second sections of an underwater pipeline, comprising means for holding the ends of the first and second sections in axial alignment, a connector body lowerable from the surface of the water for insertion into a position between the ends to connect the ends when in engagement therewith, means for supporting the body in said position between the ends of the two pipeline sections, and remotely controlled means for causing the ends and the body to be engaged, said connector body having a passageway in axial alignment with the first and second pipeline sections when so engaged for fluidly connecting said sections, and means for holding the ends of the sections in engagement with the body independently of said remotely controlled means.*

*43. Apparatus for fluidly connecting the spaced-apart ends of first and second sections of an underwater pipeline, comprising means for holding the ends of the first and second sections in axial alignment, a connector body lowerable from the surface of the water for insertion into a position between the ends to connect the ends when in engagement therewith, means for supporting the body in said position between the ends of the two pipeline sections, and remotely controlled means lowerable with the connector body for causing the ends and the body to be engaged, said connector body having a passageway in axial alignment with the first and second pipeline sections when so engaged for fluidly connecting said sections.*

References Cited

The following references, cited by the Examiner, are of record in the patented file of this patent or the original patent.

UNITED STATES PATENTS

| | | | |
|---|---|---|---|
| 1,727,677 | 9/1929 | Siebert et al. | 138—94.3 |
| 1,476,344 | 12/1923 | McGee et al. | 138—94.3 |
| 2,593,491 | 4/1952 | Saunders et al. | 285—Dig 21 |
| 3,233,667 | 2/1966 | Van Winkle | 166—.6 |
| 3,307,627 | 3/1967 | Shatto | 166—.6 |
| 3,308,881 | 3/1967 | Chan et al. | 166—.6 X |
| 3,321,217 | 5/1967 | Ahlstone | 166—.6 X |
| 3,354,951 | 11/1967 | Haeber | 166—.6 |
| 3,358,753 | 12/1967 | Haeber | 166—.6 |
| 3,415,285 | 12/1968 | Torp | 285—302 X |
| 3,052,299 | 9/1962 | Geer | 166—.6 |
| 3,419,071 | 12/1968 | Williams et al. | 166—.6 |

MARVIN A. CHAMPION, Primary Examiner

R. E. FAVREAU, Assistant Examiner

U.S. Cl. X.R.

285—18, 31

PO-1050
(5/69)

UNITED STATES PATENT OFFICE
CERTIFICATE OF CORRECTION

Patent No. Re. 27340 Dated April 25, 1972

Inventor(s) Leonard E. Williams and David L. Gruller

It is certified that error appears in the above-identified patent and that said Letters Patent are hereby corrected as shown below:

Column 10, line 22, cancel "the" (second occurrence); line 51, change "end" (second occurrence) to --and--. Column 14, line 20, change "39" to --38--.

Signed and sealed this 3rd day of October 1972.

(SEAL)
Attest:

EDWARD M.FLETCHER,JR.
Attesting Officer

ROBERT GOTTSCHALK
Commissioner of Patents